Aug. 29, 1967     R. M. DUNN     3,339,097
BOBBIN AND POLE CONSTRUCTION
Filed Aug. 10, 1965
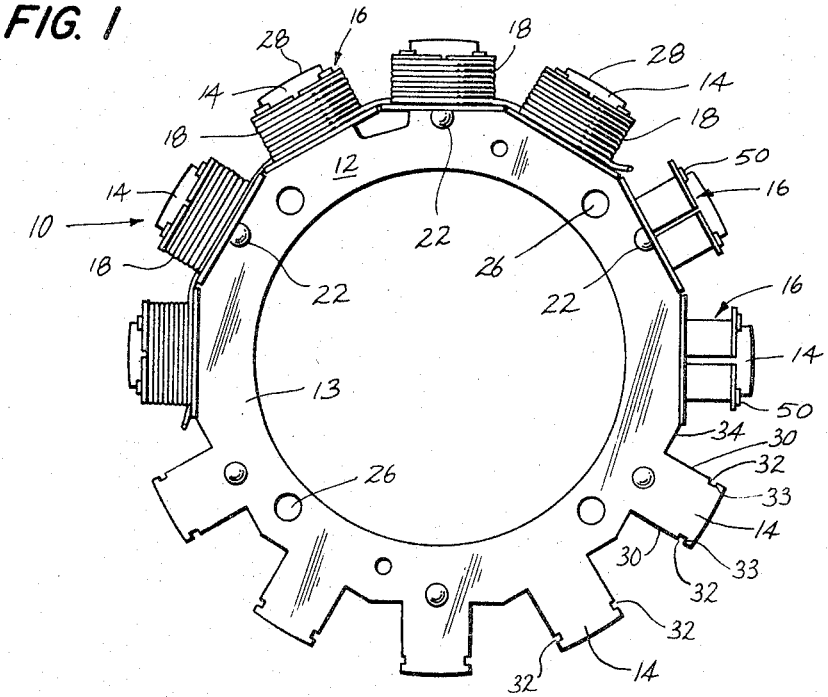
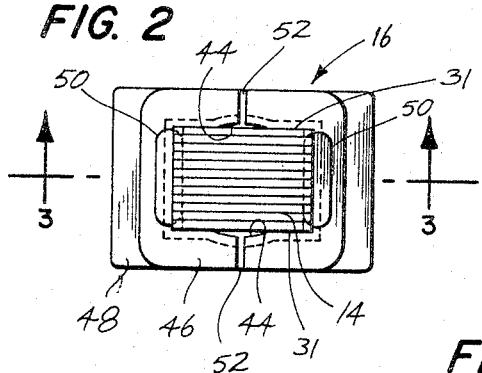
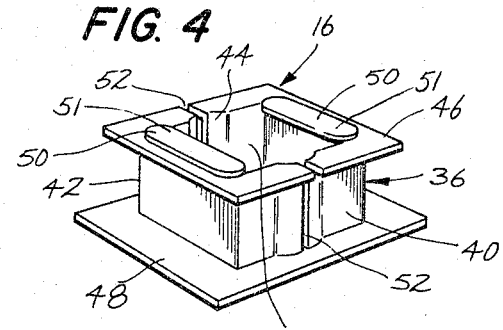
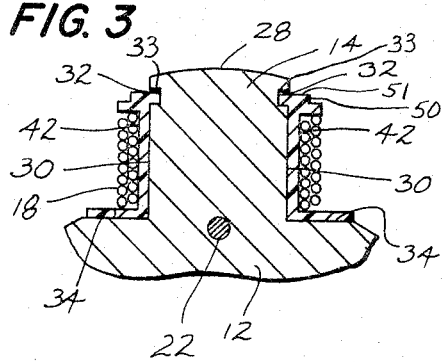
INVENTOR.
RICHARD M. DUNN
BY
McCormick, Paulding & Huber
ATTORNEYS United States Patent Office 3,339,097
Patented Aug. 29, 1967

3,339,097
BOBBIN AND POLE CONSTRUCTION
Richard M. Dunn, Chicopee Falls, Mass., assignor to Eastman Manufacturing Co., Inc., Springfield, Mass., a corporation of Massachusetts
Filed Aug. 10, 1965, Ser. No. 478,602
10 Claims. (Cl. 310—194)

This invention relates to dynamo electric machines, magnets and other electrical apparatus utilizing a coil surrounding a ferromagnetic pole or other core, and deals more particularly with an improved pole assembly and an improved bobbin for such assembly.

In the description which follows, the assembly and bobbin of this invention are shown as applied to the stator of an inductor alternator generally similar to that shown in U.S. Patent No. 3,140,413. It should be understood, however, that this has been done by way of example only and that, while the invention is particularly well suited for use in such an alternator and other dynamo electric machines, there is no intention to limit the invention to this use and that in many other instances it may be used to advantage in other electrical devices where a coil is mounted on a core by means of a bobbin interposed between the coil and the core.

The general object of the invention is to provide an improved means for mounting a coil to a pole or other core in an electrical device, which means, in comparison to present structures of the same general type, omits parts and is of lower manufacturing cost, while nevertheless, exhibiting qualities the same or better than the present structures.

Another object of this invention is to provide an improved pole and bobbin construction for an electrical device whereby the bobbin may be rapidly and easily assembled with the pole and including means for restraining the bobbin against axial movement relative to the pole both before and after a coil is wound on the bobbin so as to prevent the bobbin from sliding from the pole while in a coil winding machine and during use.

A further object of the invention is to provide an improved pole assembly and bobbin therefor, wherein the bobbin itself lockingly engages the pole to resist its displacement therefrom, thereby eliminating the necessity for employing further operations and additional parts to retain the bobbin and the associated coil in place on the pole.

Other objects and advantages of the invention will be apparent from the following description and from the drawing forming a part hereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is an elevational view of a partially assembled stator utilizing a pole construction and bobbin embodying this invention.

FIG. 2 is an enlarged plan view of one of the pole assemblies of FIG. 1.

FIG. 3 is a sectional view taken along the lines 3—3 of FIG. 2.

FIG. 4 is a perspective view of one of the bobbins employed in the FIG. 1 stator.

FIG. 5 is a fragmentary elevational view showing a bobbin of the type employed in the FIG. 1 stator during one phase of its assembly with an associated pole.

Turning now to the drawing for a detailed description of the invention, reference numeral 10 indicates in general a partially completed stator for a dynamo electric machine having pole assemblies and coil bobbins embodying this invention. The stator 10 includes a ferromagnetic core 12 having an inner annular portion 13 and a plurality of angularly spaced poles 14, 14 which extend radially outwardly from the annular portion 13. In the completely assembled state of the stator, each pole 14 receives a bobbin 16 and an armature coil 18 which is wound onto the bobbin so as to surround both the bobbin and the pole. During the use of the stator, voltages are induced in the armature coils 18, 18 through the use of a cooperating rotor (not shown) which causes periodic variations in the electromagnetic flux passing through the poles 14, 14. The illustrated core 12 includes a total of twelve poles 14, 14. For the purpose of illustration, five of these poles have been shown assembled with both a bobbin and a coil, two have been shown assembled with only a bobbin, and five have been shown free of both a bobbin and a coil. In a preferred method of assembly, however, all of the poles of the stator are assembled with bobbins before any of the coils are wound on the bobbins.

The core 12 is made of a suitable magnetic material, such as iron or steel, capable of providing a low reluctance path for the flux passing between the various poles. In order to reduce hysteresis and eddy current losses, which occur as a result of the varying flux, the core is preferably made from several laminations of sheet material which are secured in assembly by a number of rivets 22, 22. To permit attachment of the stator to an associated supporting structure, the annular core portion 13 preferably includes a number of apertures 26, 26 through which suitable fasteners may be passed.

The stator poles 14, 14 are arranged in an angularly spaced annular series and have arcuate outer end faces 28, 28. Each pole further has at least one side surface which extends for some distance generally perpendicular to its end face and which includes at least one bobbin locking recess defined therein for receiving a cooperating locking element of a bobbin 16. Preferably, and as shown, each pole 14 has a general rectangular cross-sectional shape, as best seen in FIG. 2, so as to provide a first pair of spaced parallel side surfaces 30, 30 and a second pair of spaced parallel side surfaces 31, 31. The side surfaces 30, 30 each include a bobbin locking recess 32 located close to the end face 28. The shape of the recess may vary widely without departing from the invention and in the present case is in the form of a straight-sided slot which includes an inwardly facing surface 33 and which extends transversely across the full extent of the associated surface 30. At the inner end of each of the side surfaces 30, 30 of each pole there is preferably a seating surface 34 formed by the annular core portion 13 and arranged generally perpendicular to the associated side surface 30.

Referring now to FIGS. 2, 3 and 4, the illustrated bobbin 16 comprises a tubular portion 36 having a bore 38 conforming generally to the cross-sectional shape of the poles 14, 14. As shown, the tubular portion 36 includes a first pair of spaced parallel walls 40, 40 and a second pair of spaced parallel walls 42, 42 defining a generally rectangular bore 38. A longitudinal groove 44 opening to the bore 38 may be provided in each of the walls 40, 40 to permit clearance, if necessary, between the bobbin 16 and one of the rivets 22, 22 when the bobbin is assembled upon an associated pole 14.

The bobbin 16 further includes two flanges which are respectively associated with opposite ends of the tubular portion 36 and which give the bobbin a spool-like form. These two flanges comprise an outer flange 46 associated with the outer end of the tubular portion 36 and an inner flange 48. When the bobbin is assembled with a pole and coil, the outer flange 46 engages the coil to prevent it from being displaced outwardly from the pole and the inner flange 48 abuts the associated seating surfaces 34, 34 to provide additional base support for the bobbin. The inner flange 48 also restrains the associated coil from being displaced inwardly from its assembled position on the pole and electrically insulates the coil from the core.

To restrain the bobbin 16 against axial movement relative to its associated stator pole 14, at least one locking element is provided for locking cooperation with a locking recess on the pole. In the illustrated bobbin, a pair of laterally spaced transversely disposed locking elements or tabs 50, 50 are formed upon the upper flange 46. Each of the tabs 50 includes an outwardly facing surface 51 and is arranged so as to normally extend inwardly beyond the general surface of the bobbin bore and, when assembled with a pole 14, into an associated locking recess 32 of the pole. From the foregoing description, it will be apparent that the surfaces 33, 33 of the pole and the surfaces 51, 51 of the bobbin are coengageable when the bobbin is fully assembled with the pole to prevent the bobbin from moving outwardly from the pole. Also, the bobbin is prevented from moving inwardly on the pole either by engagement of the tabs 50, 50 with the outwardly facing walls of the recesses 32, 32 or by engagement of the flange 48 with the seating surfaces 34, 34 at the base of the pole.

The bobbin 16 is deformable to spread the locking elements 50, 50 and to displace the surfaces 51, 51 from their locking positions to permit assembly of the bobbin on an associated pole 14. Various means may be employed to render the bobbin deformable, as for example, the use of a resiliently stretchable bobbin fabricating material. Preferably, however, the bobbin is made from a flexible plastic, such as nylon, and is provided with one or more slits which divide it into two parts joined by a thin hinge section about which the two parts may be moved relative to one another to effect the desired spreading of the locking tabs. In the presently preferred and illustrated embodiment of the invention, a pair of centrally disposed longitudinally extending slits 52, 52 are respectively provided in the walls 40, 40 and extend through the outer flange 46 and through the walls 40, 40 to the inner flange 48. The slits 52, 52 divide the tubular portion 36 and the associated upper flange 46 into half sections which are joined by the base flnage 48. Thus, the base flange 48 in the vicinity of the slits serves as a hinge section which is sufficiently thin and flexible as to permit the half sections to be rotated relative to one another, as a result of deformation or flexure of the hinge section, to spread the locking elements 50, 50 an amount sufficient to permit the bobbin to be assembled on an associated pole, as best shown in FIG. 5.

Because of the resilience of the bobbin material, the bobbin tends to return to its normal or undeformed position when the force causing deformation is released. Therefore, after a bobbin is placed on a pole and the spreading force released, the locking tabs 50, 50 move or snap into the locking recesses 32, 32 of the pole. The coengagement of the locking tabs 50, 50 and the walls of the respectively associated pole recesses 32, 32 thereby restrains the bobbin against axial movement relative to an associated pole even in the absence of a coil winding on the bobbin. Thus, a bobbin made in accordance with the invention will remain on its pole prior to, during and after the coil winding operation irrespective of its orientaton relative to the winding machine and the application of gravity and other forces tending to move it from the pole.

After a coil 18 is wound onto a bobbin 16, it positively prevents further spreading of the locking tabs and thereby permanently secures the locking tabs in the recesses 32, 32 to permanently secure the bobbin and the coil against axial movement relative to the pole. The need for other coil locking elements or wedges commonly used in the assembly of dynamo electric machine parts of this type is therefore eliminated.

The invention claimed is:

1. In an electromagnetic device the combination comprising a core of magnetic material including a pole having a pole face and at least one side surface extending for some distance generally normal to said pole face and including at least one recess in said side surface, and a bobbin having a tubular portion received on said pole and also having at least one locking element extending inwardly into said pole recess to restrain said bobbin against axial movement relative to said pole, said bobbin in the absence of a coil winding thereon being deformable to displace said locking element outwardly from said pole beyond said recess to permit its assembly thereon.

2. The combination defined in claim 1 further characterized by a coil surrounding said tubular bobbin portion and preventing it from being deformed sufficiently to remove said locking element from said locking recess.

3. In an electromagnetic device the combination comprising an annular core of magnetic material having on its radially outer portion a plurality of circumferentially spaced radially outwardly extending poles, each of said poles having a side surface including a locking recess therein, a plurality of tubular bobbins received on respectively associated ones of said poles and each adapted to receive a coil winding, and a locking element on each of said bobbins extending inwardly into the locking recess of the associated pole, each of said bobbins being deformable in the absence of a coil thereon to displace its locking element outwardly from its pole beyond the locking recess thereof to permit its assembly thereon.

4. The combination defined in claim 3 further characterized by a plurality of coils each wound on a respective one of said bobbins and each preventing its associated bobbin from being deformed sufficiently to remove its locking element from the locking recess of the associated pole.

5. A bobbin for use with an electromagnetic device having a core of magnetic material providing a pole having at least one inwardly facing locking surface, said bobbin comprising a tubular portion adapted to receive a coil and having a bore conforming generally to the cross-sectional shape of said pole so as to be receivable thereon, said bobbin having at least one outwardly facing locking surface which normally assumes such a position relative to the remainder of said bobbin as to be engageable with said inwardly facing locking surface of said pole when said bobbin is received thereon to prevent axial displacement of said bobbin from said pole, said bobbin in the absence of a coil thereon being deformable to displace said outwardly facing locking surface laterally from its normal position and laterally beyond said inwardly facing surface of said pole to permit said bobbin to be assembled with said pole.

6. A bobbin for use with an electromagnetic device having a core of magnetic material providing a pole having at least one side surface including a locking recess, said bobbin comprising a tubular portion adapted to receive a coil and having a bore conforming generally to the cross-sectional shape of said pole so as to be receivable thereon, and at least one locking element which normally assumes such a position relative to the remainder of said bobbin as to reside in said locking recess of said pole when said bobbin is received thereon to limit movement of said bobbin axially of said pole, said bobbin in the absence of a coil thereon being deformable to displace said locking element laterally outwardly from its normal position to permit said bobbin to be assembled with the pole by being moved axially over said pole.

7. A bobbin as defined in claim 6 further characterized by said bobbin including at least one slit extending at least partially along the length thereof to facilitate its deformation.

8. A bobbin for use with an electromagnetic device having a core of magnetic material providing a pole having at least one side surface including a locking recess, said bobbin comprising a tubular portion adapted to receive a coil and having a bore conforming generally to the cross-sectional shape of said pole so as to be receivable thereon, said bobbin including two axially extending slits on opposite sides thereof which divide said bobbin into two parts and which slits extend from one end of said bobbin to a point very close to the opposite end of said bobbin so as to leave thin hinge sections adjacent said opposite end joining said two bobbin parts and about which hinge sections said two parts may be rotated to spread apart said one end of said bobbin, and a locking element on one of said bobbin parts adjacent said one end of said bobbin which locking element is arranged to reside in said locking recess of said pole to limit movement of said bobbin axially of said pole, said locking element being movable laterally outwardly beyond said locking recess by said spreading of said one end of said bobbin.

9. A bobbin as defined in claim 8 further characterized by two laterally outwardly extending flanges located respectively at opposite ends of said tubular bobbin portion, said two slits each extending through one of said flanges and through said tubular portion, and said hinge sections being provided by the other one of said flanges.

10. A bobbin as defined in claim 9 further characterized by said bobbin including two locking elements each located on a respective one of said two bobbin parts adjacent the flange located at said one end of said bobbin.

References Cited

UNITED STATES PATENTS

| | | | |
|---|---|---|---|
| 916,961 | 4/1909 | Anderson | 310—194 |
| 1,776,518 | 9/1930 | McShane | 310—194 |
| 3,112,898 | 12/1963 | Stahl | 336—198 |

MILTON O. HIRSHFIELD, *Primary Examiner.*

L. L. SMITH, *Assistant Examiner.*